(12) United States Patent
Rault (10) Patent No.: US 7,130,350 B1
(45) Date of Patent: Oct. 31, 2006

(54) METHOD AND SYSTEM FOR ENCODING AND DECODING DATA IN A VIDEO STREAM

(75) Inventor: Patrick Rault, Toronto (CA)

(73) Assignee: ViXS Systems, Inc., Toronto (CA)

( * ) Notice: Subject to any disclaimer, the term of this patent is extended or adjusted under 35 U.S.C. 154(b) by 691 days.

(21) Appl. No.: 10/376,895

(22) Filed: Feb. 28, 2003

(51) Int. Cl.
*H04B 1/66* (2006.01)

(52) U.S. Cl. .................................. 375/240.15

(58) Field of Classification Search ........... 375/240.16, 375/240.25, 240.01, 240.15; 348/473, 584, 348/465; *H04B 1/66*
See application file for complete search history.

(56) References Cited

U.S. PATENT DOCUMENTS

| | | | |
|---|---|---|---|
| 4,866,395 A | 9/1989 | Hosteller | |
| 5,027,203 A | 6/1991 | Samad et al. | |
| 5,093,847 A | 3/1992 | Cheng | |
| 5,115,812 A | 5/1992 | Sano et al. | |
| 5,253,056 A | 10/1993 | Puri | |
| 5,475,434 A | 12/1995 | Kim | |
| 5,563,950 A | 10/1996 | Easter et al. | |
| 5,602,589 A | 2/1997 | Vishwanath et al. | |
| 5,635,985 A | 6/1997 | Boyce et al. | |
| 5,644,361 A | 7/1997 | Ran et al. | |
| 5,650,825 A * | 7/1997 | Naimpally et al. | ......... 348/465 |
| 5,652,749 A | 7/1997 | Davenport et al. | |
| 5,732,391 A | 3/1998 | Fiocca | |
| 5,737,020 A | 4/1998 | Hall et al. | |
| 5,740,028 A | 4/1998 | Sugiyama et al. | |
| 5,844,545 A | 12/1998 | Suzuki et al. | |
| 5,850,443 A | 12/1998 | Van Oorschot et al. | |
| 5,940,130 A | 8/1999 | Nilsson et al. | |
| 5,996,029 A | 11/1999 | Sugiyama et al. | |
| 6,005,623 A | 12/1999 | Takahashi et al. | |
| 6,005,624 A | 12/1999 | Vainsencher | |
| 6,014,694 A | 1/2000 | Aharoni et al. | |
| 6,040,863 A | 3/2000 | Kato | |
| 6,081,295 A | 6/2000 | Adolph et al. | |
| 6,141,693 A | 10/2000 | Perlman et al. | |
| 6,144,402 A | 11/2000 | Norsworthy et al. | |
| 6,167,084 A | 12/2000 | Wang et al. | |
| 6,182,203 B1 | 1/2001 | Simar, Jr. et al. | |
| 6,208,745 B1 * | 3/2001 | Florencio et al. | ........... 382/100 |
| 6,215,821 B1 | 4/2001 | Chen | |
| 6,219,358 B1 | 4/2001 | Pinder et al. | |
| 6,222,886 B1 | 4/2001 | Yogeshwar | |
| 6,226,041 B1 * | 5/2001 | Florencio et al. | ........... 348/473 |

(Continued)

FOREIGN PATENT DOCUMENTS

EP 0661826 A2 7/1995

(Continued)

OTHER PUBLICATIONS

Yu, Donghoom, et al., "Fast Motion Estimation for Shape Coding in MPEG-4," IEEE Transactions on Circuits and Systems for Video Technology, vol. 13, No. 4, 2003 IEEE, Apr. 2003, pp. 358-363.

(Continued)

*Primary Examiner*—Tung Vo (57) ABSTRACT

In a block-based video stream, a first bit representing video data at a predefined location is identified. The video data at the first bit is replaced with a bit of non-video data prior to being transmitted to a device used to process the block-based video stream. Additional bits of non-video information are transmitted by replacing additional bits of video data within the block based video stream. A processing device that receives the block-based video stream accesses the non-video bits to obtain the non-video data.

36 Claims, 8 Drawing Sheets

U.S. PATENT DOCUMENTS

| | | | |
|---|---|---|---|
| 6,236,683 B1 | 5/2001 | Mougeat et al. | |
| 6,259,741 B1 | 7/2001 | Chen et al. | |
| 6,263,022 B1 | 7/2001 | Chen et al. | |
| 6,300,973 B1 | 10/2001 | Feder et al. | |
| 6,307,939 B1 | 10/2001 | Vigarie | |
| 6,314,138 B1 | 11/2001 | Lemaguet | |
| 6,323,904 B1 | 11/2001 | Knee | |
| 6,366,614 B1 | 4/2002 | Pian et al. | |
| 6,373,530 B1 * | 4/2002 | Birks et al. | 348/584 |
| 6,385,248 B1 | 5/2002 | Pearlstein et al. | |
| 6,438,168 B1 | 8/2002 | Arye | |
| 6,480,541 B1 | 11/2002 | Girod et al. | |
| 6,507,618 B1 * | 1/2003 | Wee et al. | 375/240.16 |
| 6,526,099 B1 | 2/2003 | Christopoulos et al. | |
| 6,549,561 B1 | 4/2003 | Crawford | |
| 6,563,953 B1 * | 5/2003 | Lin et al. | 382/233 |
| 6,584,509 B1 | 6/2003 | Putzolu | |
| 6,594,311 B1 * | 7/2003 | Pearlstein | 375/240.01 |
| 6,621,866 B1 * | 9/2003 | Florencio et al. | 375/240.25 |
| 6,687,384 B1 * | 2/2004 | Isnardi | 382/100 |
| 6,714,202 B1 | 3/2004 | Dorrell | |
| 6,724,726 B1 | 4/2004 | Coudreuse | |
| 6,748,020 B1 | 6/2004 | Eifrig et al. | |
| 2001/0026591 A1 | 10/2001 | Keren et al. | |
| 2002/0106022 A1 | 8/2002 | Takahashi et al. | |
| 2002/0110193 A1 | 8/2002 | Kyoon et al. | |
| 2002/0138259 A1 | 9/2002 | Kawahara | |
| 2002/0145931 A1 | 10/2002 | Pitts | |
| 2002/0196851 A1 | 12/2002 | Arnaud | |
| 2003/0093661 A1 | 5/2003 | Loh et al. | |
| 2003/0152148 A1 | 8/2003 | Laksono | |

FOREIGN PATENT DOCUMENTS

| | | |
|---|---|---|
| EP | 0739138 A2 | 10/1996 |
| EP | 0805599 A2 | 11/1997 |
| EP | 0855805 A2 | 7/1998 |
| EP | 0896300 B1 | 2/1999 |
| EP | 0901285 A1 | 2/1999 |
| EP | 0955607 A2 | 11/1999 |
| EP | 1032214 A2 | 8/2000 |
| EP | 1087625 A2 | 3/2001 |
| JP | 07-210670 A | 8/1995 |
| WO | WO 01/95633 A2 | 12/2001 |
| WO | WO 02/080518 A2 | 10/2002 |

OTHER PUBLICATIONS

Pyun, Jae-Young, "QoS Provisioning for Video Streaming Over IEEE 802.11 Wireless LAN," (abridged) IEEE Conferences in Consumer Electronics, Jun. 16, 2003, EE Times, Seoul, Korea, <http://eetimes.com/printableArticle?doc_id=OEG2003061S00-70> retrieved Jul. 8, 2003.

Youn, Jeongnam et al., "Video Transcoding For Multiple Clients," Proceedings of the SPIE, Bellingham, VA, vol. 4067, XP008012075, pp. 76-85. University of Washington, Sealttle, WA.

Lengwehasatit, Krisda et al., "Computationally Scalable Partial Distance Based Fast Search Motion Estimation," Packet Video Corp., San Diego, California.

Takahashi, Kuniaki, et al., "Motion Vector Synthesis Algorithm for MPEG2-to-MPEG4 Transcoder," Proceedings of the SPIE, Bellingham, VA, vol. 4310, Sony Corporation, XP008000078, pp. 387-882, 2001 SPIE.

Soares, Luis Ducla, et al., "Influence of Encoder Parameters on the Decoded Video Quality for MPEG-4 Over W-CDMA Mobile Networks," NTT DoCoMo, Inc.

Aggarwal, Manoj et al., "Efficient Huffman Decoding," 2000 IEEE, 0-7803-6297-7, pp. 936-939, University of Illinois at Urbana-Champaign, Urbana, IL.

Sherwood, P. Greg et al., "Efficient Image and Channel Coding for Wireless Packet Networks," University of California, La Jolla, California.

Assuncao, Pedro et al., "Rate Reduction Techniques for MPEG-2 Video Bit Streams," SPIE, vol. 2952, Apr. 1996, pp. 450-459, University of Essex; Colchester, England.

Yin, Peng et al., "Video Transcoding by Reducing Spatial Resolution," Princeton University, 2000, Princeton, New Jersey.

Shanableh, Tamer et al., "Heterogeneous Video Transcoding to Lower Spatio-Temporal Resolutions and Difference Encoding Formats," IEEE Transactions on Multimedia, vol. 2, No. 2, Jun. 2000, pp. 101-110, Engineering and Physical Sciences Researc Counsel, Colchester, U.K.

Wiegand, Thomas et al., "Long-Term Memory Motion-Compensated Prediction for Rubust Video Transmittion," in Proc. ICIP 2000, University of Erlangen-Buremberg, Erlangen, Germany.

Fan, Zhigang et al. "Maximum Likelihood Estimation of JPEG Quantization Table in the Identification of Bitmap Compression History," Xerox Corporation, Webster, New York.

Thomas, Shine M. et al., "An Efficient Implentation of MPEG-2 (BC1) Layer 1 & Layer 2 Stereo Encoder on Pentium-III Platform", pp. 1-10, Sasken Communication Technologies Limited, Bangalore, India.

Ramanujan, Ranga S. et al., "Adaptive Streaming of MPEG Video Over IP Networks," 22nd IEEE Conference on Local Computer Networks (LCN '97), Nov. 2-5, 1997, 1997 IEEE, pp. 398-409, Architecture Technology Corporation, Minneapolis, MN.

Rejaie, Reza et al., "Architectural Considerations for Playback of Quality Adaptive Video Over the Internet," XP002177090, 2000 IEEE pp. 204-209, AT&T Labs, Menlo Park, California.

Bouras, C. et al.,"On-Demand Hypermedia/Multimedia Service Over Broadband Networks," XP-002180545, 1996 IEEE Proceedings of HPDC-5 '96, pp. 224-230, University of Patras, Patras, Greece.

Chalidabhongse, Junavit et al., "Fast Motion Vector Estimation Using Multiresolution-Spatio-Temporal Correlations," IEEE Transactions On Circuits and Systems For Video Technology, vol. 7, No. 3 Jun. 1997, pp. 477-488.

Oh, Hwang-Seok et al., "Block-Matching Algorithm Based On An Adaptive Reduction of the Search Area For Motion Estimation," Real-Time Imaging, Academic Press Ltd., vol. 56, No. 5, Oct. 2000, pp. 407-414, XP004419498 ISSN: 1077-2014 , Taejon, Korea.

Lee, Liang-Wei et al., "Dynamic Search-Window Adjustment and Interlaced Search for Block-Matching Algorithm," IEEE Transactions On Circuits and Systems for Video Technology, IEEE, vol. 3, No. 1, Feb. 3, 1993, pp. 85-87, XP000334581 ISSN: 1051-8215, New York.

Fukunaga, Shigeru et al., "MEPG-4 Video Verification Model Version 16.0" International Organization for Standardization: Coding of Moving Pictures and Audio, vol. N3312, Mar. 2000, pp. 1-380, XP000861688.

Kroner, Sabine et al., "Edge Preserving Noise Smoothing With An Optimized Cubic Filter," DEEI, University of Trieste, Trieste, Italy.

Kim, Jaemin et al., "Spatiotemporal Adaptive 3-D Kalman Filter for Video," pp. 1-12. Samsung Semiconductor, Inc. San Jose, California.

Liu, Julia J., "ECE497KJ Course Project: Applications of Wiener Filtering In Image and Video De-Noising," pp. 1-15, May 21, 1997.

Jostschulte, K. et al., "A Subband Based Spatio-Temporal Noise Reduction Technique for Interlaced Video Signals," University Dortmund, Dortmund, Germany.

Kossentini, Faouzi et al. "Predictive RD Optimized Motion Estimation for Very Low Bit-Rate Video Coding," 1997 IEEE, XP-000726013, pp. 1752-1963, Sep. 1, 1996. 1997 International Conference on Image Processing, Vancouver, Canada.

Tourapis, Alexis et al., "New Results on Zonal Based Motion Estimation Algorithms—Advanced Predictive Diamond Zonal Search," 2001 IEEE, pp. V 183-V 186, The Hong Kong University of Science and Technology, Clear Water Bay, Kowloon, Hong Kong.

Brandenburg, Karlheinz, "MP3 and AAC Explained," Proceedings of AES 17th International Conference, XP008004053, pp. 99-110, Erlangen, Germany.

Painter, Ted et al., "Perceptual Coding of Digital Audio," Proceedings of the IEEE, vol. 88, No. 4, Apr. 2000, pp. 451-513, XP001143231, ISSN: 0018-9219, Arizona State University, Tempe, AZ.

Hassanzadegan, Hooman et al., "A New Method for Clock Recovery in MPEG Decoders," pp. 1-8, Basamad Negar Company, Tehran, Iran.

Kan, Kou-Sou et al., "Low-Complexity and Low-Delay Video Transcoding for Compressed MPEG-2 Bitstream," Natinal Central University, Chung-Li, Taiwan.

Mitchell et al., "MPEG Video Compression Standard: 15.2 Encoder and Decoder Buffering," Chapman and Hall Digital Multimedia Standards Series, pp. 340-356, XP002115299, ISBN: 0-412-08771-5, Chapman and Hall, New York.

Whybray, M.W. et al., "Video Coding—Techniques, Standards and Applications," BT Technol J. vol. 14, No. 4, Oct. 4, 1997, pp. 86-100, XP000722036.

"SHARP Product Information: VTST-Series NTSC/PAL Electronic Television Tuners," RF Components Group, Sharp Microelectronics of the America, 1997.

Edwards, Larry M., "Satisfying Your Need for Net Speed," San Diego Metropolitan, Sep. 1999, <<www.sandiegometro.com/1999/sept/speed.html>>, retrieved on Jul. 19, 2001.

Oz, Ran et al., "Unified Headend Technical Management of Digital Services," BigBend Networks, Inc.

Muriel, Chris, "What is Digital Satellite Television?," What is Digital Television Rev. 3.0; Apr. 21, 1999, SatCure, Sandbach, England, <<http://www.netcentral.co.uk/satcure/digifaq.htm>>, access on Apr. 20, 2001.

"CONEXANT Products & Tech Info: Product Briefs: CX24108," 2000-2002 Conexant Systems, Inc. access on Apr. 20, 2001.

"CONEXANT Products & Tech Info: Product Briefs: CX22702," 2000-2002 Conexant Systems, Inc. access on Apr. 20, 2001.

"TDC: Components for Modems & Digital Infotainment: Direct Broadcast Satellite Chipset," 2001 Telecom Design Communications Ltd., U.K., <<http://www.tdc.co.uk/modmulti/settop/index.htm>>, access on Apr. 20, 2001.

"White Paper: Super G: Maximizing Wireless Performance," Mar. 2004, Atheros Communications, Inc., pp. 1-20, Document No. 991-00006-001, Sunnyvale, California.

Kwok, Y.K. et al., "Efficient Multiple Access Control Using a Channel-Adaptive Protocol for a Wireless ATM-Based Multimedia Services Network," Mar. 29, 2000, Computer Communications 24(2001) 970-983, University of Hong Kong, Hong Kong, PRC.

Liang, Ying-Chang et al., "Joint Downlink Beamforming, Power Control, and Data Rate Allocation for DS-CDMA Mobile Radio with Multimedia Services," 2000 IEEE, pp. 1455-1457, Ceneter for Wireless Communication, Singapore.

Razavi, Behzad, "Challenges in Portable RF Transceiver Design," Sep. 1996, 1996 IEEE, pp. 12-25, Circuits & Devices.

Mannion, Patrick, "IceFyre Device Cools 802.11a Power Consumption," Sep. 24, 2001, Planet Analog, National Semiconductor, <<http://www.planetanalog.com/story/OEG20010924S0079>>, access on Nov. 5, 2001.

"ICE Fyre Semiconductor: IceFyre 5-GHz OFDM Modem Solution," Sep. 2001, pp. 1-6, ICEFYRE: Rethink Wireless, IceFyre Semiconductor, Inc.

Pozar, David M., "Theory and Design of Ferrimagnetic Components," 1990, pp. 529, Microwave Engineering, Addison-Wesley Publishing Company, Inc.

"Part 11: Wireless LAN Medium Access Control (MAC) and Physical Layer (PHY) Specifications: High-Speed Physical Layer in the 5 GHz Band," 1999 IEEE, pp. 1-83, Supplement to IEEE Standard fo rInformation Technology, IEEE Std 802.11a-1999, LAN/MAN/ Standards Committee.

Ciciora, Walter S., "Cable Television in the United States: An Overview," May 25, 1995, pp. 1-90, Cable Television Laboratories, Inc., Louisville, Colorado.

Pedro Assuncao and Mohammad Ghanbari, "Rate Reduction Techniques for MPEG-2 Video Bit Streams," SPIE vol. 2952, Apr. 1996, 10 pp.

Jae-Young Pyun, "QoS Provisioning for Video Streaming over IEEE 802.11 Wireless LAN," (abridged) IEEE Conference in Consumer Electronics, Jun 16, 2003, 3 pp. [online ] Retrieved from the Internet Jul. 8, 2003 at URL.

Krisda Lengwehasatit and Antonio Ortega, "Computationally Scalable Partial Distance Based Fast Search Motion Estimation," Univ. of Southern California, 4 pp., date unknown.

Manoj Aggarwal and Ajai Narayan, "Efficient Huffman Decoding," 2000 IEEE, 0-7803-6297-7, pp. 936-939.

Peng Yin et al., "Video Transcoding by Reducing Spatial Resolution," Princeton University, Princeton, NJ, 4 pp., 2000.

Zhigang Fan and Ricardo de Queiroz, "Maximum Likelihood Estimation of JPEG Quantization Table in the Identification of Bitmap Compression History," Xerox Corporation, Webster, NY, 4 pp., date unknown.

Luis Ducla Soares et al., "Influence of Encoder Parameters on the Decoded Video Quality for MPEG-4 Over W-CDMA Mobile Networks," NTT DoCoMo, Inc. technical paper, 4 pp., date unknown.

Thomas Wiegand et al., "Long-Term Memory Motion-Compensated Prediction for Rubust Video Transmittion," in Proc. ICIP2000, 4 pp.

P. Greg Sherwood et al., "Efficient Image and Channel Coding for Wireless Packet Networks," Univ. of CA, San Diego, CA, 4 pp., date unknown.

Donghoon Yu et al., "Fast Motion Estimation for Shape Coding in MPEG-4," 2003 IEEE Transactions on Circuits and Systems for Video Technology, vol. 13, No. 4, Apr. 2003, pp. 358-363.

Shine M. Thomas, Rahul Kumar & Vasudha Bhat, "An Efficient Implentation of MPEG-2 (BC1) Layer 1 & Layer 2 Stereo Encoder on Pentium-III Platform", Sasken Communication Technologies Limited, Banalore, India, pp. 1-10.

* cited by examiner

FIGURE 11

METHOD AND SYSTEM FOR ENCODING AND DECODING DATA IN A VIDEO STREAM

FIELD OF THE DISCLOSURE

The present invention relates generally to providing data over a video stream, and more specifically to providing data over a block based video stream.

BACKGROUND

Many different compression algorithms have been developed in the past for digitally encoding video and audio information to minimize the bandwidth required to transmit this information for a given picture quality. Several multimedia specification committees have established and proposed standards for encoding/compressing and decoding/decompressing audio and video information. The most widely accepted international standards have been proposed by the Moving Pictures Expert Groups (MPEG), and are generally referred to as the MPEG-1, MPEG-2 and MPEG-4 standards. These MPEG standards for moving picture compression are used in a variety of current video playback products, including digital versatile (or video) disk (DVD) players, multimedia PCs having DVD playback capability, and satellite broadcast digital video.

In general, in accordance with the MPEG standards, the audio and video data comprising a multimedia data stream are encoded/compressed in an intelligent manner using a compression technique generally know as "motion coding". More particularly, rather than transmitting each video frame in its entirety, MPEG uses motion estimation for only those parts of sequential pictures that vary due to motion, where possible. In general, the picture elements or "pixels" of a picture are specified relative to those of a previously transmitted reference frame using motion vectors that specify the location of a 16-by-16 array of pixels or "macroblock" within the current frame relative to its original location within the reference frame. Three main types of video frames or pictures are specified by MPEG, namely, I-type, P-type, and B-type pictures.

An I frame is coded using only the information contained in that frame, and hence, is referred to an "intra-coded".

A P frame is coded/compressed using motion compensated prediction (or 'motion estimation") based upon information from a past reference frame (either I-type or P-type).

A B frame is coded/compressed using motion compensated prediction (or "motion estimation") based upon information from either a past and/or a future reference frame (either I-type or P-type), or both. B frame pictures are usually inserted between I-type or P-type pictures, or combinations of either.

Figure 1:
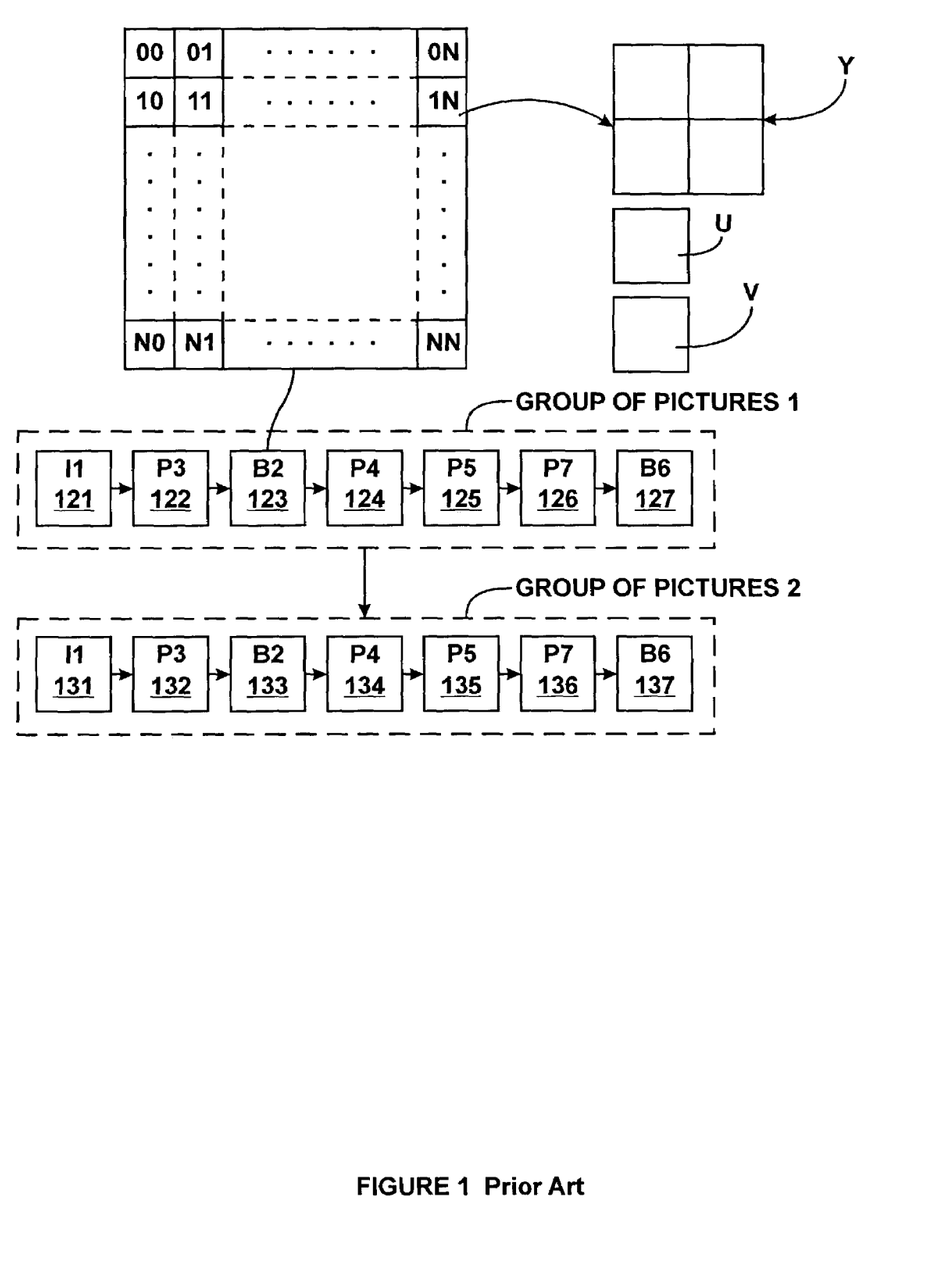
FIG. 1 illustrates in block form, block-based video data in accordance with the prior art.

FIG. 1, which is consistent with the prior art, illustrates a frame having macroblock locations 00 through NN identified. In one embodiment, the frame and macroblocks in FIG. 1 are consistent with a MPEG standard, and though the number of macroblocks varies, each macroblock represents a 16×16 array of pixels. During MPEG compression, a motion vector set is associated to this 16×16 array of pixels ... In order to store raw data for a single macroblock, it will be appreciated that three color components, RGB or YUV data, will need to be saved. Therefore, the amount of space needed to store an un-compressed macroblock picture would require three 16×16 sample arrays. However, as allowed in the MPEG standards, compressed data for a macroblock can be stored in a 4/2/0 format. As illustrated in FIG. 1, 4/2/0 format represents the picture information within a macroblock with four blocks of luminance data (Y) and two blocks of chrominance data (one U, and one V). The term block is used consistent with the MPEG standard to represent an 8×8 array of pixel information. In effect, using a 4/2/0 format compresses a macroblock of raw video data from twelve blocks of data to six blocks of data.

FIG. 1 further illustrates how each frame relates to a group of pictures of a video stream. FIG. 1 illustrates two groups of pictures. Each group of pictures receives frames in a specific order by frame type. Specifically, each group of pictures illustrated receives frames of specific types in the stated order: I frame, P frame, B frame, P frame, P frame, P frame, and, B frame. While frames are received in the order indicated, they are not necessarily displayed in that order. Instead, the frames are displayed in the order indicated by the numeric suffix of each frame's type. Therefore, the sequential display order of the frames, once decoded, would be: I1, B2, P3, P4, P5, B6, P7. It will be appreciated, that the order of reception and order of display is consistent with the previous description of the coding of P frames and B frames. For example, in order for frame B2 to be decoded, the information associated with frame B2, prior frame, I1 and subsequent frame, P3, must be received first.

The MPEG protocol supports transmission of audio stream data, video stream data, and other non-audio/video stream data. It is often desirable for content, such as the video content to be blocked based on access control techniques to prevent unauthorized access. This information is generally sent using the non-audio/video packet capabilities of the MPEG protocol. However, such transmission of access control information lends itself to be bypassed by merely separating the video stream data from the non-video stream data. Therefore, it would be useful to provide access control information and other information in a manner that didn't lend itself to being separated from the video stream.

Therefore it can be seen that a system and method for transmitting non-video information in a block based multimedia protocol would be useful.

DETAILED DESCRIPTION OF THE FIGURES

Figure 2:
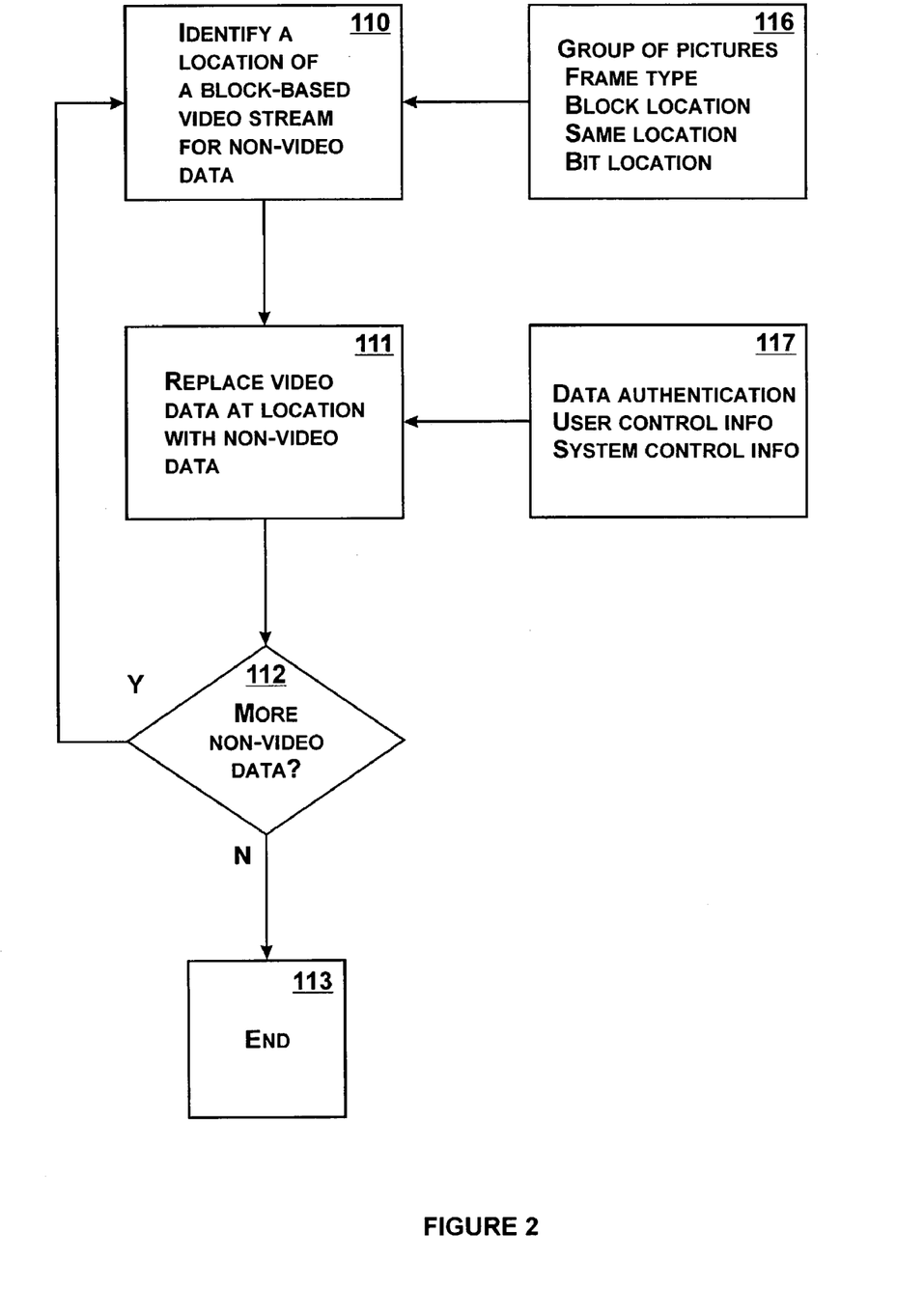
FIG. 2 illustrates, in flow diagram form, a method in accordance with the present disclosure.

The present disclosure relates generally to providing non-video data to a block based video stream. In addition, the present disclosure relates generally to retrieving the non-video data from block-based video streams. FIG. 2 illustrates a specific method in accordance with the present disclosure.

At step 110, a location within a block-based video stream is identified for the storage of non-video data. As indicated in block 116, there are numerous considerations which can be taken into account in identifying a specific location for the non-video based data. For example, the specific location where non-video data is to be stored can be dependent upon a specific group of pictures, a specific frame within a group of pictures, or a specific block within a group or frame of pictures. For example, within a group of pictures a specific frame selected by its frame type, or frame location, could be identified to contain the non-video data. Furthermore, within an identified frame, specific blocks may be identified to contain the non-video data. Within an identified block, the location to store non-video data can be restricted to specific samples associated with the block. Likewise, within each identified sample, it is possible for the location of non-video data to be further limited by a specific bit location. It will be appreciated, that any type of information uniquely identifying a group of pictures, a frame, a block, or a sample within a block that is associated with the MPEG protocol can be used to identify a specific location where non-video data is to be stored.

At step 111, a video data at the location identified at step 110, is replaced with non-video data. As indicated in block 117, such information can be: data authentification information, such as would be used to allow a user to view specific multimedia presentation material; user control information, such as channel select, volume control, or picture control information that would be provided by the user; or system control information, whereby a system between an end user and an content provider of the video content inserts digital information for any of a number of purposes including data authentification, control or identification.

At step 112, a determination is made whether more non-video data is to be inserted in the correct video stream, if so the flow proceeds back to step 110. If not, the flow terminates at step 113. Specific implementations of the method of FIG. 2 are further described with reference to FIGS. 3–11.

Figure 3:
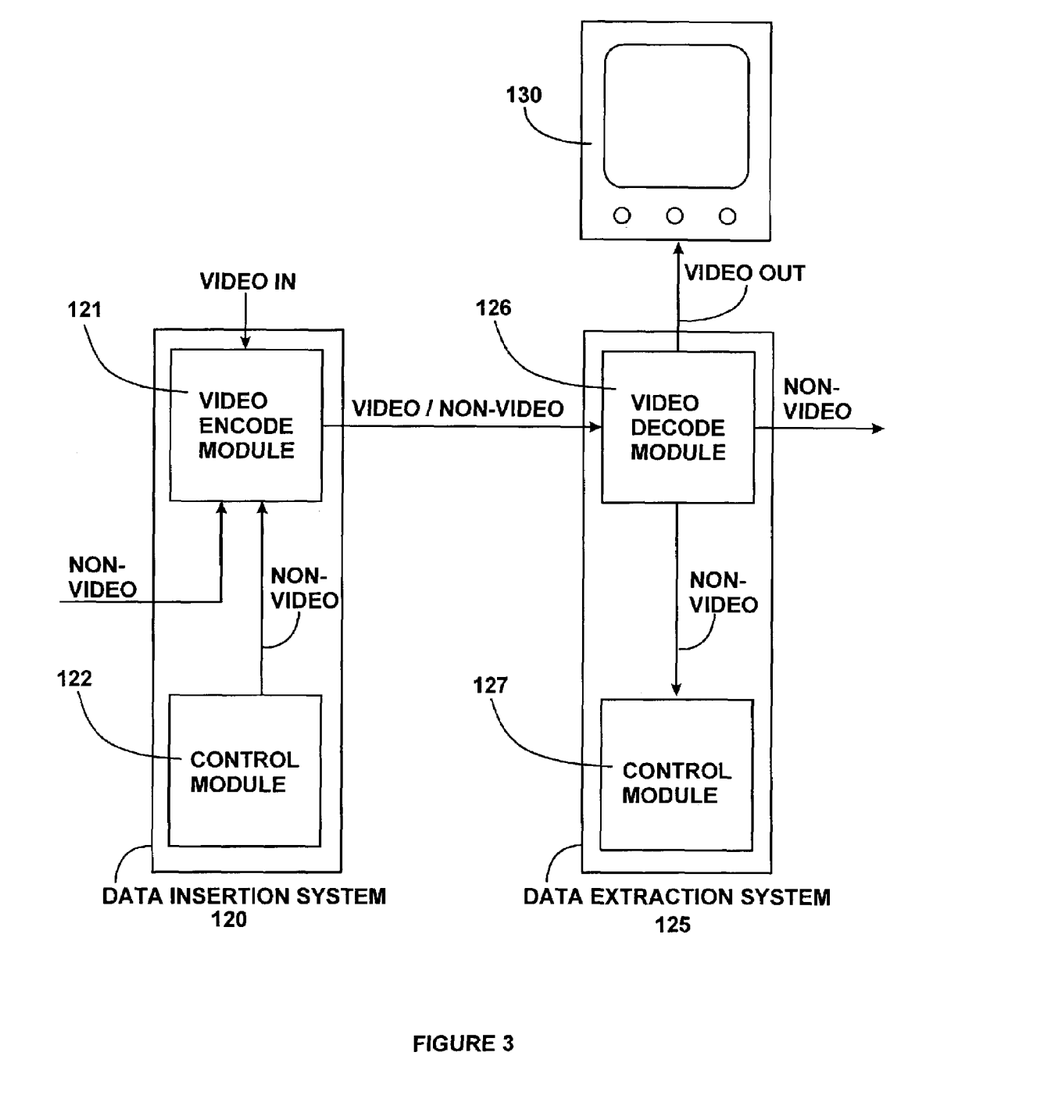
FIG. 3 illustrates, in block diagram form, a system for providing non-video information in accordance with the present disclosure.

FIG. 3 illustrates, in block diagram form, a system in accordance with the present disclosure. FIG. 3 includes a data insertion system 120, a data extraction system 125, and a display device 130. In operation, the data insertion system 120 receives at a video encode module 121 non-video data from one or more sources. As illustrated, the non-video data can come from an internal source, such as control module 122 within the data insertion system 120, or from another source including an external source. In addition, the data insertion system 120 receives a video-in signal. In one embodiment the video-in signal is a block based video stream. In another embodiment, the video-in signal can be an analog based video signal that is subsequently digitized and converted to a block based video stream. The data insertion system is coupled to the data extraction system 125 to provide a combination of video/non-video data over a video stream. It will be appreciated, that the term video stream used herein refers to those packets within a video stream transmission that contain video data, such as video packets in an MPEG transmission.

Upon receiving the combined video/non-video data, the data extraction module 125 extracts non-video data from the video data and provides it to appropriate destinations. For example, the non-video data can be provided to an external source, or to an internal source, such as control module 127. The video data or the video/non-video data can be processed to create rendered video and provided to a display device. The data insertion module 120 further comprises a video encode module 121 coupled to a control module 122. In operation, the video encode module 121 receives video-in data and non-video data. The non-video data can be received from an external source, as indicated, or from an internal control module 122. Examples of an internal control module would include user authentification modules, identification insertion modules, as well as other control modules for controlling the flow of video information. In addition, it will be appreciated that the data inserted does not have to be related to the content of the video stream.

Data extraction system 125 further includes a video decode module 126 which receives the video/non-video data and extracts the non-video data. In one embodiment, at least a portion of the non-video data is provided to a control module 127. It will be appreciated that control module 127 working in unison with the control module 122, can be used to provide a wide range of control features between the data insertion system 120 and the data extraction system 125. Since the video data replaced by the non-video information is lost, the video decode module 126 can decode the non-video information, or replace it with a predefined value.

Figure 4:
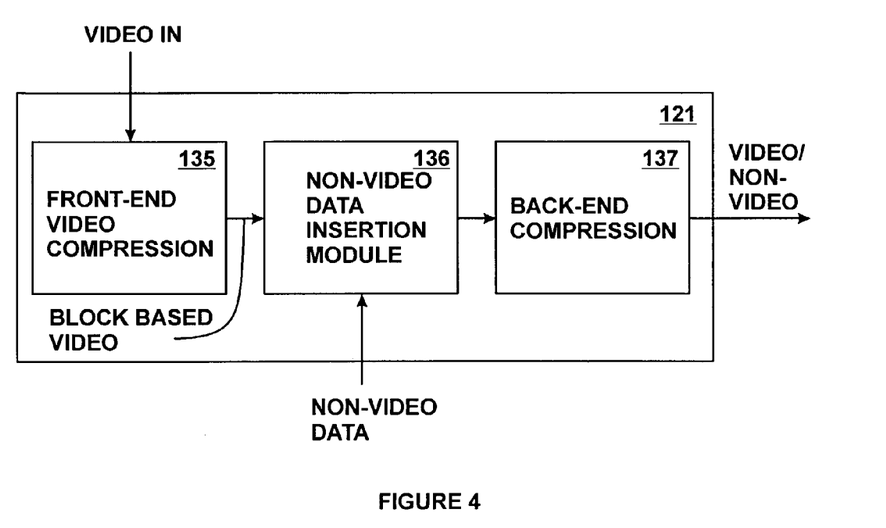
FIG. 4 illustrates in block diagram form, a video encode module of FIG. 3 in greater detail.

FIG. 4 illustrates, in block diagram form, a portion of the video encode module 121 of FIG. 3, in greater detail. Specifically, FIG. 4 illustrates the video encode module 121 further comprising a front-end video compression portion 135, a video data insertion system 136, and a back end compression module 137. In operation, the video-in signal is received at the front end video compression portion 135. The front end video compression portion 135 performs a first set of compression operations to provide a block based video stream to the non-video insertion module 136. Upon receiving the block based video information, the non-video data insertion module 136 will insert the non-video data into a specific location of the video stream. The video stream is provided to a back end compression module 137, which can perform addition compression of the video stream before being transmitted. It will be readily appreciated, that the specific embodiments will exist where the video-in signal received is in a condition ready to have the non-video data inserted, such as a block based video form, and the actual front end video compression module 135 would not be used.

Figure 5:
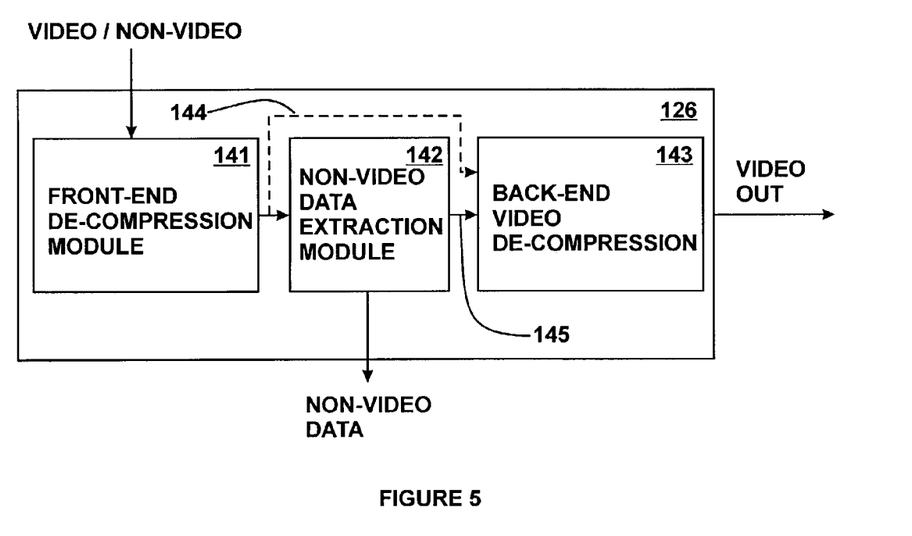
FIG. 5 illustrates, in block diagram from, a portion of the video decode module of FIG. 3 in greater detail.

FIG. 5 illustrates in more detail an embodiment of a portion of the video decode module 126 of FIG. 3. Specifically, FIG. 5 illustrates a front-end decompression module 141, a non-video data extraction module 142, and a back end decompression video module 143. In operation, the video/non-video data is received in the front-end decompression module 141. The front end decompression module 141 performs any initial decompression to be associated with the video decode module 126. The initially decompressed video stream is provided to the non-video extraction module 142. At the non-video data extraction module 142, the non-video data is extracted from the location where it was initially inserted. Next, the back end video decompression module 143 performs any final decompression before providing the video data out.

The back end video decompression system 143 can receive video data to be decompressed either directly from the non-video data extraction module 142, or from the front end decompression module 141. Where the information is received from the front end decompression module 141, it will be appreciated that the back end video decompression module receives both the video data and the non-video data. In one embodiment, this is acceptable in that the non-video data has been inserted into the video stream such that any artifacts introduced into the picture as a result of the non-video data would be either imperceptible to the viewer or degrade the quality by a level whereby it would be acceptable. In an alternate embodiment, the non-video data could be replaced by other data by the non-video data extraction module 142. For example, all of the locations containing non-video data could be set to a specific value. However, it will be appreciated that the original video data contained at the storage location of the non-video data will not be recovered.

Figure 6:
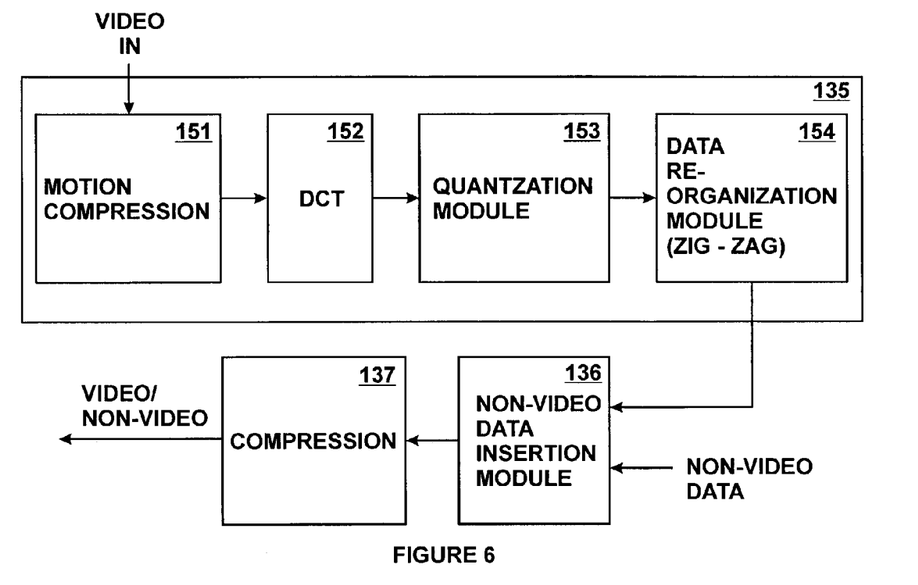
FIG. 6 illustrates, in block diagram form, a more detailed view of the encode module of FIG. 4.

FIG. 6 illustrates, in block diagram form, the system of FIG. 4 in greater detail. Specifically, the front end video compression module is shown in greater detail. The front end video compression module 135 is illustrated to further include a motion compensation module 151, a discreet cosines transform module 152, a quantization module 153, and data reorganization module 154. The specific operation of the modules illustrated in FIG. 6 will be discussed with reference to the specific data representation flow of FIG. 8.

Figure 8:
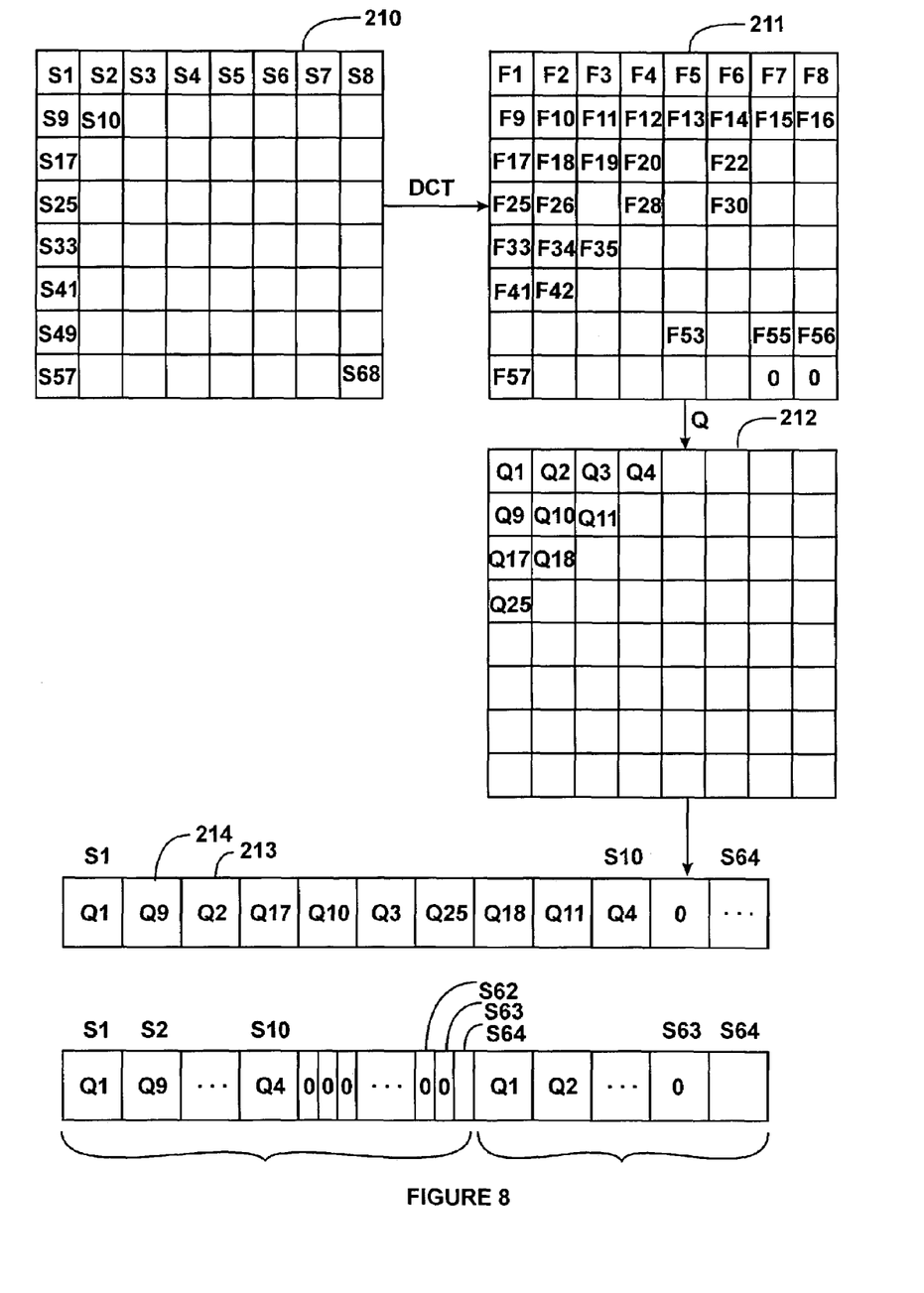
FIG. 8 illustrates, in block form, specific representations of frame data during an encoding process.

In operation, when a non-compressed video signal is received, a motion compensation is performed by block 151. As previously discussed, one aspect of motion compensation would be to determine motion vectors. These motion vectors would generally be associated with the specific macroblock. Referring to FIG. 8, a block of data 210 represents raw of compressed video data. For references herein, the raw data can be either the video-in data prior to motion compensation or the video-in data after motion compression. Specifically, the raw data refers to image data which is stored in a spatial format hence the "s" prefix representing each sample.

The block of data 210 is received at the discreet cosinus transform block 152, where a discreet cosinus transform is performed. It will be appreciated that the discreet cosinus transform will convert the block of data 210 from a spatial domain into a frequency domain. Because most of the information associated with specific blocks of video tend to have low frequency components, it is a well recognized property of video that, as a general rule, video information stored within the frequency domain will be more compacted than the information stored in the spatial domain. This is represented in FIG. 8 by block 211, where only those samples having non-zero information are illustrated. In other words, T1, T2, T3 represent specific samples of block 211 having non-zero data. The prefix "F" is used in block 211 to indicate the samples represent frequency data.

Next, at the quantization module 153, a quantization is performed on the data block 211 generated by module 153. By quantizing the data, the amount of data representing a frame is further reduced. This is illustrated in FIG. 8 by block 212, whereby even fewer samples of the block 212 contain non-zero data as compared to the block 211. It will be further appreciated, that the quantization step performed by the quantization module 153 is a lossy operation, in that it is not possible to get back the exact information once quantization is performed.

At the data reorganization module 144 the information received from the quantization module 153 is reorganized. Often referred as a zigzag operation, the data reorganization module 154 operates on the fact that the non-zero data of quantized information following the discreet cosinus transform step of 152 results in the non-zero data being generally located at the low frequency corner (top left) at the macroblock 212. By reorganizing the data to place the data stream samples containing data adjacent to one another, the back end compression step performed by compression module 137 can be more efficient. The reorganized video data 214 is provided to the non-video data insertion module 136 which inserts the non-video data prior to providing it to the compression module 137.

Figure 7:
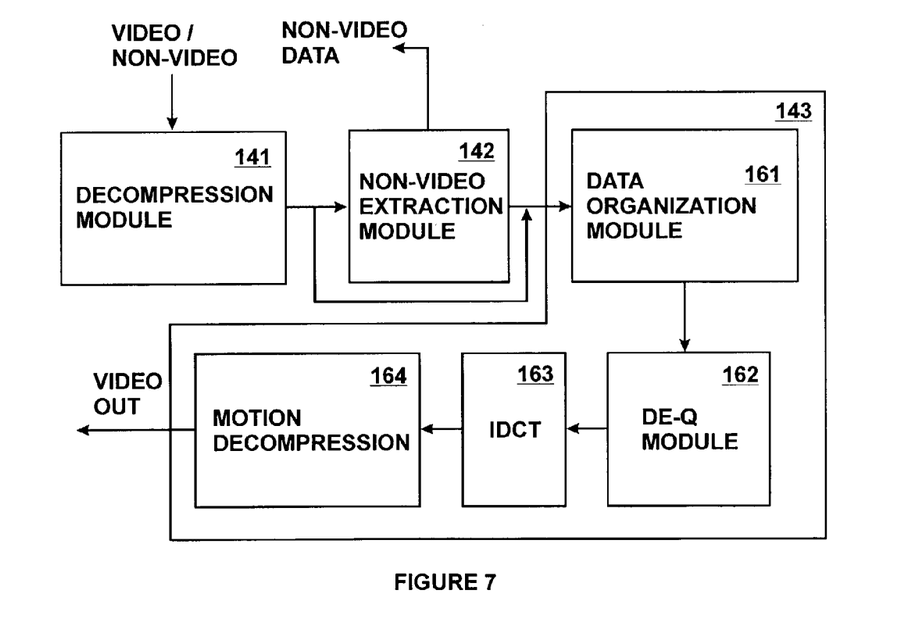
FIG. 7 illustrates, in block diagram form, a more detailed view of the decode module of FIG. 5.

FIG. 7 illustrates, in a reverse but analogous manner, a more detailed view of the back end video decompression module 143 of FIG. 5. Specifically, the back end video compression module 143 is further illustrated in FIG. 7 to comprise a data organization module 161, a dequantification module 162, an inverse discreet transform module 163, and a motion decompression module 164. In operation, the data organization module 161 receives video data to be decompressed either directly from the non-video extraction module 142 or from the decompression module 141. The data organization module 161 will perform what is generally referred to as a de-zig-zag operation to provide a quantified representation of a block of data such as is illustrated by block 212 of FIG. 8.

Module 161 provides its output stream to the de-quantification 162 which performs a de-quantification to provide a block representation similar to that of 211 in FIG. 8. It will be appreciated, that because the quantification is a lossy operation the data values represented in 211 following de-quantification will generally not be exactly the same as they were prior to quantization by quantification module 153.

Following de-quantification, an inverse discreet transform module 163 performs an inverse discreet transform function on the frequency domain block in order to provide a block of spatial data such as block 210 representing video data. Lastly, the motion compensation module 164 can perform any additional decompression such as motion compensation prior to providing the video-out.

Figure 9:
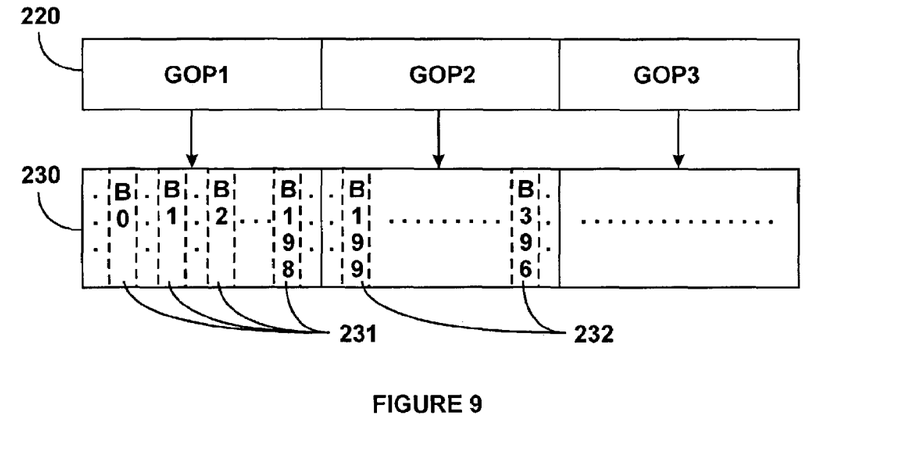
FIGS. 9 and 10 illustrate, in block form, data stored within a group of pictures in accordance with the present invention.
Figure 10:
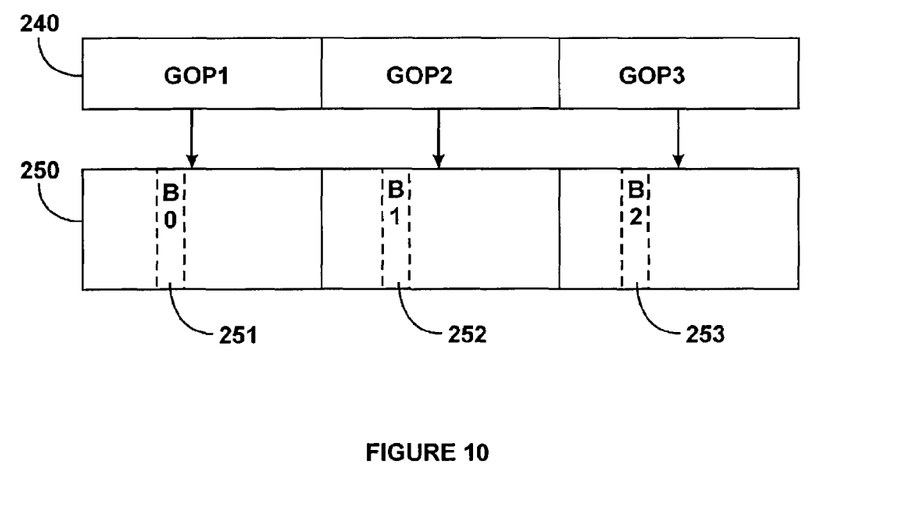
Figure 11:
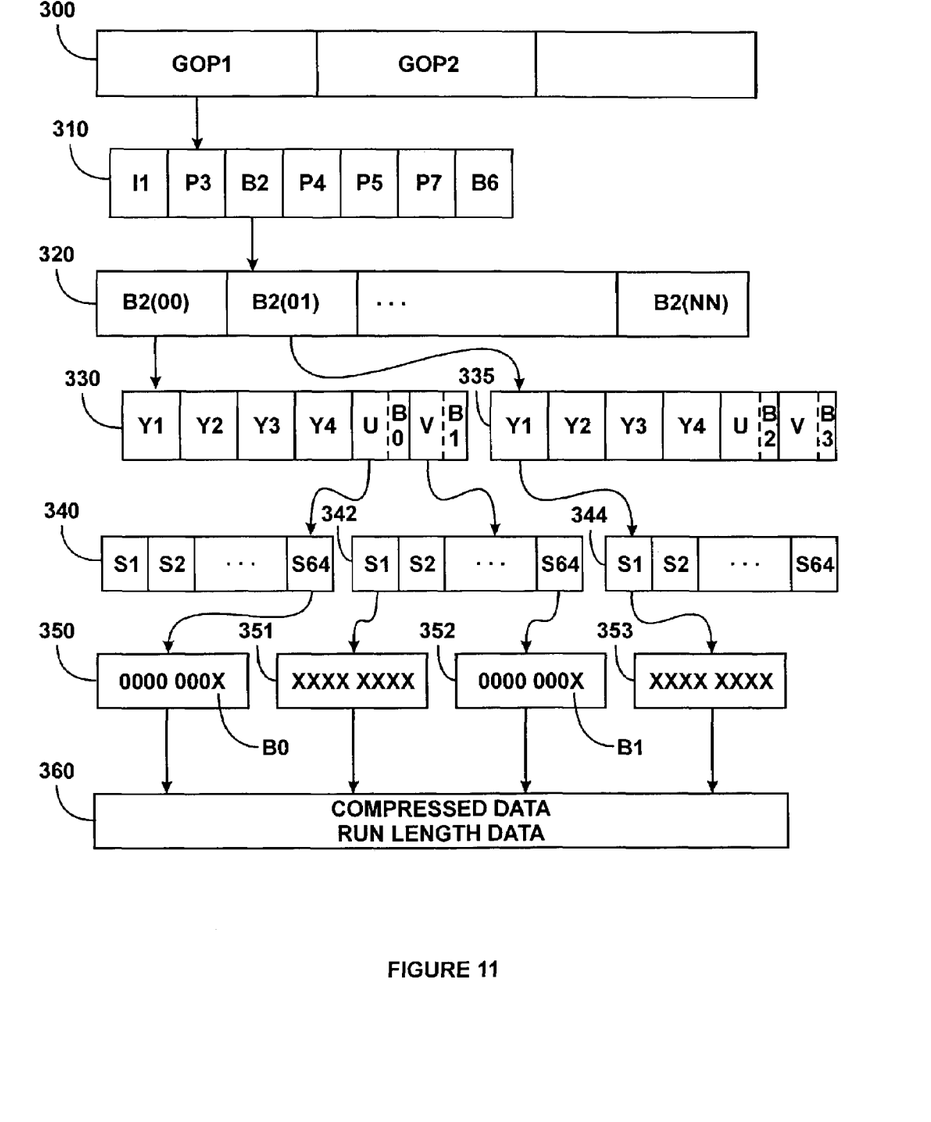
FIG. 11 illustrates, in block form, a specific implementation illustrating data within a specific group of pictures.

FIGS. 9–11 illustrate specific examples of the insertion of data using the system and methods described herein. FIG. 9 illustrates a video stream 220 comprising groups of pictures GOP1, GOP2, and GOP3. A blow-up view 230 of each of the group of pictures indicates that within each group of pictures a plurality of non-video data, represented by B#, where # represents integers beginning at 0 and proceeding upwards. Specifically, FIG. 9 illustrates that each group of pictures can have a plurality of non-video data bits stored within it. In one embodiment, each block of data within the group of pictures could contain one or more bits of non-video data. In another embodiment, only the chrominance blocks of data, e.g. U and V data, would contain non-video data, since human perception is less sensitive to chrominance data than it is to luminance data. Therefore, by not modifying the luminance data, any resulting artifacts would be generally less noticeable than if luminance data were modified.

FIG. 10 illustrates another embodiment of the present disclosure wherein the video stream 240 is illustrated in a blow up as video stream 250. Specifically, each group of pictures of the video stream 250 is illustrated to have a single portion of non-video data stored within it. In one embodiment, a single bit of data could be stored within each group of pictures. In other embodiments, not every Group of Pictures would need to store any non-video data.

FIG. 11 illustrates a specific embodiment for inserting non-video information within a video stream. FIG. 11 illustrates the video stream 300 comprising a first and second group of pictures. The first group of pictures is further represented by stream portion 310. Specifically, the first group of pictures comprises an I frame I1, P frame P3, B frame B2, P frame P4, P frame P5, P frame P7, and B frame B6. In accordance with specific embodiments of the present disclosure, FIG. 11 illustrates that only the B frames are selected to have non-video data inserted. In one embodiment, this can provide an advantage in that B frames are not used for further video prediction. In other words, if an I frame, or a P frame were to have non-video data inserted into it, the non-video can be propagated into subsequent frames through prediction processes, thereby allowing artifacts to be more perceptible to an end user. By limiting non-video data to the B frames, the error introduced by insertion of the non-video data is not propagated beyond the B frame.

The specific B frame is illustrated as stream 320 in FIG. 11. B frame B2 is illustrated to have blocks of data B2 (00) through B2 (N,N). Each of the blocks illustrated in stream 320 represents a macroblock of the B frame B2.

The first macroblock of stream 320, B2 (00), is further illustrated as data block 330 to comprise four blocks of luminance data, Y1–Y4, and two blocks of chrominance data, U and V. Likewise, the second macroblock of B frame B2, B2 (01), is illustrated as data block 335 which also include four luminance blocks and two chrominance blocks. In the specific embodiment illustrated, the block 330 representing the macroblock B2 (00) stores a single bit of non-video data in each of the chrominance blocks. For example, a first bit of data, B0, is stored within the U chrominance block of the macroblock B2 (00) while a second bit of data, B 1, is stored within the V chrominance block of macroblock B2, (00). In a similar manner, the block 335, representing macroblock B2 (01), stores a single bit of information in each of the two chrominance blocks as illustrated. The chrominance block U of data block 330 is further illustrated as samples 340. As illustrated, 64 samples reside within each 8×8 block of data. Therefore, samples S1 through S64 are represented. In a similar manner, the V chrominance data is also represented as samples 342. The sample S64 within sample 340 represents the last word of the chrominance data block U of block B2(00) data stream. By the last sample, it is referred to as the sample that would be at one end of a specific block of data transmission of a specific block of data. For example, the last sample of a chrominance block, Sample 64 of block 340 is further represented by byte 350. Byte 350 is illustrated to have seven bits of zeros followed by an unknown bit X. The unknown Bit X represents the non-data to be inserted. The first sample of the V, in stream 330, block immediately following the last sample of the U block is illustrated as sample 351. 351 is illustrated as having 8 bits set to X. It will be appreciated, that a bit set to X represents a bit that is associated with a byte that is expected to have non-zero value.

Therefore, during compression, the samples of a block are encoded only if one of them is different from zero. A flag specifies the presence or not of the block samples in the video stream. In an embodiment, the data bit will be inserted in the last bit of the last sample of a chrominance block. For example, byte 350 is the last sample of U chrominance block 340, and byte 352 is the last sample of the V chrominance block 342. By limiting data insertion to only those blocks of data that are non-zero, an efficient compression is realized when entropy encoding, involving a run length encoding is implemented by block 360. Note that even though all bytes 350–353 are illustrated as flowing to compressed run length data 360, each block is generally compressed independently of each other block. By limiting data insertion to only those blocks of data that are chrominance blocks, artifacts resulting from the insertion of data are minimized.

In a specific embodiment, the data inserted in the data stream can include a specific bit code representing a start code. For example, a series of zeros of a specified length followed by a one can indicate a data start indicator. Once the data start indicator is recognized, the inserted data stream can be retrieved. Where the data to be inserted has a fixed length, it can be repeated in a continuous manner. In another embodiment, additional codes can be inserted in place of the start code, or following the start code to indicate the presence and/or types of data being sent.

It will now be appreciated that non-video data can be inserted in a video stream in a manner that will reduce artifacts in displayed video, and won't have significant impact on data size.

The various functions and components in the present application may be implemented using an information-handling machine such as a data processor, or a plurality of processing devices. Such a data processor may be a microprocessor, microcontroller, microcomputer, digital signal processor, state machine, logic circuitry, and/or any device that manipulates digital information based on operational instruction, or in a predefined manner. Generally, the various functions, and systems represented by block diagrams are readily implemented by one of ordinary skill in the art using one or more of the implementation techniques listed herein. When a data processor for issuing instructions is used, the instruction may be stored in memory. Such a memory may be a single memory device or a plurality of memory devices. Such a memory device may be read-only memory device, random access memory device, magnetic tape memory, floppy disk memory, hard drive memory, external tape, and/or any device that stores digital information. Note that when the data processor implements one or more of its functions via a state machine or logic circuitry, the memory storing the corresponding instructions may be embedded within the circuitry that includes a state machine and/or logic circuitry, or it may be unnecessary because the function is performed using combinational logic. Such an information handling machine may be a system, or part of a system, such as a computer, a personal digital assistant (PDA), a hand held computing device, a cable set-top box, an Internet capable device, such as a cellular phone, and the like.

In the preceding detailed description of the figures, reference has been made to the accompanying drawings, which form a part thereof, and in which is shown by way of illustration specific embodiments in which the disclosure may be practiced. These embodiments are described in sufficient detail to enable those skilled in the art to practice the disclosure, and it is to be understood that other embodiments may be utilized and that logical, mechanical, chemical and electrical changes may be made without departing from the spirit or scope of the disclosure. To avoid detail not necessary to enable those skilled in the art to practice the disclosure, the description may omit certain information known to those skilled in the art. Furthermore, many other varied embodiments that incorporate the teachings of the disclosure may be easily constructed by those skilled in the art. Accordingly, the present disclosure is not intended to be limited to the specific form set forth herein, but on the contrary, it is intended to cover such alternatives, modifications, and equivalents, as can be reasonably included within the spirit and scope of the disclosure. The preceding detailed description is, therefore, not to be taken in a limiting sense, and the scope of the present disclosure is defined only by the appended claims.

What is claimed is:

1. A method of including non-video data in a video stream, the method comprising:
    identifying in a block-based video stream a first block of image data at a first predefined location of the block based video stream; and
    replacing at least one first bit of the first block of image data with a first portion of non-image data, where the at least one first bit is at a predefined location within the first block.

2. The method of claim 1, wherein replacing comprises the first block of image data being a frequency representation of video data.

3. The method of claim 2, wherein identifying comprises the first block of image data being a portion of a bidirectional fame of data.

4. The method of claim 2, wherein identifying comprises the first block of image data being a block of chrominance data.

5. The method of claim 4, wherein identifying comprises the first block of image data being a portion of a bidirectional frame of data.

6. The method of claim 4, wherein replacing further comprises the predefined location being a portion of a last word of the first block.

7. The method of claim 6, wherein replacing comprises the portion of the last word being the last bit of the first block.

8. The method of claim 2, wherein identifying comprises the first block of image data being a block of luminance data.

9. The method of claim 2, wherein identifying comprises the first block of image data being a block of image data compliant with a Motion Picture Expert's Group (MPEG) protocol.

10. The method of claim 1, further comprising:
    compressing the first block of image data after replacing.

11. The method of claim 10, wherein compressing comprises compressing using run length encoding.

12. The method of claim 10, wherein compressing comprises compressing using Huffman encoding.

13. The method of claim 1 further comprising:
    identifying in the block-based video stream a second block of image data at a second predefined location of the block based video stream;
    replacing at least one second bit of the second block of image data with at least a second portion of the non-image data, where the at least one second bit is at a predefined location within the second block.

14. The method of claim 13, wherein the first block is at a predefined picture group location within a first picture group and the second block is at the predefined picture group location within a second picture group.

15. The method of claim 13, wherein the first block is at a first predefined picture group location within a first picture group and the second block is at a second predefined picture group location within the first picture group.

16. A method of receiving non-image data comprising:
    identifying in a block-based video stream a first block of image data at a first predefined location of the video stream; and
    storing at least one bit of the first block of image data as at least a portion of non-image data, where the at least one bit is at a predefined location within the first block.

17. The method of claim 16, wherein identifying comprises the first block of image data being a frequency representation of image data.

18. The method of claim 17, wherein identifying comprises the first block of image data being a bidirectional frame of image data.

19. The method of claim 17, wherein identifying comprises the first block of image data being a block of chrominance data.

20. The method of claim 19, wherein identifying comprises the first block of image data further being a portion of a bidirectional frame of data.

21. The method of claim 19, wherein storing further comprises the predefined location being at least a portion of a last word of the first block.

22. The method of claim 21, wherein storing further comprises the at least a portion of the last word being the last bit of the first block.

23. The method of claim 17, wherein identifying comprises the first block of image data being a block of luminance data.

24. The method of claim 16, wherein identifying comprises the first block of image data being a block of image data compliant with a Motion Picture Expert's Group (MPEG) protocol.

25. The method of claim 16, further comprising:
    decompressing the first block of image data prior replacing.

26. The method of claim 25, wherein decompressing comprises decompressing using nm length encoding.

27. The method of claim 25, wherein compressing comprises compressing using Huffman encoding.

28. The method of claim 16 further comprising:
    identifying in the block-based video stream a second block of image data at a second predefined location of the video stream;
    storing at least one bit of the second block of image data as at least a portion of the non-image data, where the at least one bit is at a predefined location within the first block.

29. The method of claim 16, wherein the first block is at a predefined picture group location within a first picture group and the second block is at the predefined picture group location within a second picture group.

30. The method of claim 16, wherein the first block is at a first predefined picture group location within a first picture group and the second block is at a second predefined picture group location within a second picture group.

31. A method of encoding non-image data in a block-based video stream, the method comprising:
    determining a plurality of non-image data portions, each one of the plurality of non-image data portions to be associated with a different block of data;
    storing the plurality of non-image data portions in the different blocks of data, wherein the different blocks of data each represent image data in a frequency domain.

32. The method of claim 31 further comprising:
    compressing the different blocks of data after storing.

33. The method of claim 31, wherein storing comprises each of the different blocks of data are associated with bidirectional frames of image data.

34. The method of claim 31, wherein storing comprises each of the different blocks of data being associated with a different group of pictures than each other of the different blocks of data.

35. A system comprising:
a video data processing element;
a memory coupled to the video data processing element, the memory comprising:
  a video data storage region to store a first frame of image data and a second frame of image data; and
  a program storage region to store program instructions, the program instructions to facilitate:
    identifying in a block-based video stream a first block of image data at a first predefined location of the video stream; and
    replacing at least one bit of the first block of image data with at least a first portion of non-image data, where the at least one bit is at a predefined location within the first block.

36. A system comprising:
means for identifying, in a block-based video stream, a selected block of image data at a predefined location of the block-based video stream; and
means for replacing at least one first bit of the selected block of image data with a first portion of non-image data, where the at least one first bit is at a predefined location within the selected block.

* * * * *

UNITED STATES PATENT AND TRADEMARK OFFICE
CERTIFICATE OF CORRECTION

| | | |
|---|---|---|
| PATENT NO. | : 7,130,350 B1 | Page 1 of 1 |
| APPLICATION NO. | : 10/376895 | |
| DATED | : October 31, 2006 | |
| INVENTOR(S) | : Patrick Rault | |

It is certified that error appears in the above-identified patent and that said Letters Patent is hereby corrected as shown below:

Column 9, Line 19, change "fame" to --frame--

Column 10, Line 31, change "nm" to --run--

Signed and Sealed this

Thirteenth Day of March, 2007

JON W. DUDAS
*Director of the United States Patent and Trademark Office*